(12) United States Patent
Leidecker et al.

(10) Patent No.: US 8,037,810 B2
(45) Date of Patent: Oct. 18, 2011

(54) PISTON FOR A HYDRAULIC BRAKE AND METHOD FOR PRODUCTION THEREOF

(75) Inventors: Hans-Dieter Leidecker, Eschborn (DE); Götz Mehner, Königstein (DE); Matthias Würz, Oberursel (DE); Norbert Leidecker, Eschborn (DE); Uwe Zeibig, Achern (DE); Herwig Bauer, Bad Vilbel (DE)

(73) Assignees: Continental Teves AG & Co. oHG, Frankfurt (DE); Sander Umformtechnik GmbH & Co., KG, Rechen/Ulm (DE)

( * ) Notice: Subject to any disclaimer, the term of this patent is extended or adjusted under 35 U.S.C. 154(b) by 621 days.

(21) Appl. No.: 12/158,089

(22) PCT Filed: Dec. 18, 2006

(86) PCT No.: PCT/EP2006/069816
§ 371 (c)(1),
(2), (4) Date: Aug. 28, 2008

(87) PCT Pub. No.: WO2007/071640
PCT Pub. Date: Jun. 28, 2007

(65) Prior Publication Data
US 2008/0314239 A1     Dec. 25, 2008

(30) Foreign Application Priority Data
Dec. 21, 2005   (DE) .................. 10 2005 061 354

(51) Int. Cl.
*F16J 1/00*     (2006.01)
*B23P 15/10*    (2006.01)

(52) U.S. Cl. ..................... 92/172; 29/888.04

(58) Field of Classification Search ............. 92/168, 92/172, 208; 29/888.04; 188/72.4
See application file for complete search history.

(56) References Cited

U.S. PATENT DOCUMENTS
5,105,917 A    4/1992    Sporzynski et al.
(Continued)

FOREIGN PATENT DOCUMENTS
DE    8708507    9/1987
(Continued)

OTHER PUBLICATIONS
Patent Abstracts of Japan, publication No. 61269938 A, date of publication: Nov. 29, 1986, Applicant: Kuno Kinzoku Kogyo KK.
(Continued)

*Primary Examiner* — Michael Leslie
(74) *Attorney, Agent, or Firm* — RatnerPrestia

(57) ABSTRACT

A piston for a hydraulic brake configured as a bowl, open on one side, with a longitudinal axis, a wall and a bottom, and is delimited on an open end face by a rim with an axial abutment surface which is movable into abutment on a brake pad. The bottom has an essentially plane outside surface, a wall thickness of the bottom is thicker than a minimum wall thickness of the wall, and at a transition area between bottom and wall, a wall thickness of the wall is continuously increasing towards the bottom, thus, the wall passing over into the bottom in a slope. Furthermore, a method including forming a disc-shaped round blank into a bowl-type hollow cylinder, and upsetting the hollow cylinder in its longitudinal axis so that the bottom material is thickened due to the upsetting operation.

11 Claims, 2 Drawing Sheets

U.S. PATENT DOCUMENTS

| | | | | |
|---|---|---|---|---|
| 5,231,916 A | * | 8/1993 | Weiler | 92/172 |
| 6,269,734 B1 | * | 8/2001 | Leidecker et al. | 92/208 |
| 6,637,317 B1 | * | 10/2003 | Zeibig et al. | 92/208 |
| 7,000,526 B2 | * | 2/2006 | Bennett et al. | 92/172 |

FOREIGN PATENT DOCUMENTS

| | | |
|---|---|---|
| DE | 196 03 586 A1 | 8/1997 |
| EP | 1 414 613 B1 | 5/2004 |
| FR | 1.464.559 | 1/1967 |
| JP | 54107871 A | 8/1979 |
| WO | WO 01/02745 A1 | 1/2001 |
| WO | WO 03/015980 A1 | 2/2003 |

OTHER PUBLICATIONS

Patent Abstracts of Japan, publication No. 03151123 A, dated of publication Jun. 27, 1991, Applicant: Kuno Kinzoku Kogyo KK.

Patent Abstracts of Japan, publication No. 2002070902 A, date of publication: Mar. 8, 2002, Applicant: Akebono Brake Ind Co. Ltd.

Patent Abstracts of Japan, publication No. 01091930, date of publication: Apr. 11, 1989, Applicant: Taiho Kogyo Co Ltd.

* cited by examiner

PISTON FOR A HYDRAULIC BRAKE AND METHOD FOR PRODUCTION THEREOF

This application is the U.S. national phase application of PCT International Application No. PCT/EP2006/069816, filed Dec. 18, 2006, which claims priority to German Patent Application No. DE102005061354.3, filed Dec. 21, 2005, the contents of such applications being incorporated by reference herein.

BACKGROUND OF THE INVENTION

1. Field of the Invention

The present invention relates to a piston for a hydraulic brake, which is manufactured in forming processes from a metallic base material, in particular from plane sheet metal, and is configured as a bowl, open on one side, with a longitudinal axis, a wall and a bottom, and is delimited on an open end face by a rim with an axial abutment surface which is movable into abutment on a brake pad.

2. Description of the Related Art

WO 01/02745 A1 discloses a piston of this type. The piston is a cold-worked piston which is preferably made in a deep-drawing process. Compared to cast pistons, the above piston is comparatively thin-walled, and the base material, the wall and the bottom have the same thin wall thickness. In order to prevent the bottom from deforming when pressurized pressure fluid is applied to it, it has a convex curvature with regard to a piston outside surface, with the result that the stress causes compressive strain in the bottom. Due to this stabilizing constructive design of the bottom, a large clearance volume develops between piston and an associated brake cylinder. Furthermore, the forces that act on the bottom are transmitted into the wall of the piston, and increased stress is produced in a transition area between bottom and wall. To compensate the stress, the material is folded several times at this point. It proves being advantageous in this respect that the folding of the material is particularly complicated in terms of the configuration and cost-intensive, especially as regards the manufacturing tool.

EP 1 414 613 B1 discloses a method of manufacturing a piston for a hydraulic brake comprising the following steps: punching out a disc-shaped round blank from a base material of defined thickness, especially a piece of sheet metal, forming the blank into a bowl-type hollow cylinder by means of a press die and a stamp, and compression molding of the bowl-type hollow cylinder for forming the bottom with a defined wall thickness and a cylindrical wall with a defined wall thickness. As a result of the forming process executed, the wall thickness of the piston is greatly reduced compared to the base material, in particular in the transition of bottom and wall. To achieve a sufficient rate of piston wall thickness, i.e. stability and rigidity, it is required to choose a comparatively thick base material, with higher manufacturing costs being hereby incurred.

SUMMARY OF THE INVENTION

One object of the invention is to provide a piston which has improved hydraulic properties and is based on a stress-optimized construction, while another objective is to disclose a method of favorably making the piston which can represent appropriate stress-optimized features of construction.

According to an aspect of the invention, the bottom has an essentially plane outside surface, a wall thickness of the bottom is thicker than a minimum wall thickness of the wall, and at one transition area between bottom and wall, a wall thickness of the wall is continuously increasing towards the bottom, thus, the wall passing over into the bottom with a slope. No clearance volume develops in the brake cylinder due to the plane outside surface, the quantity of fluid in the circle of hydraulic actuation being reduced as a result, what improves the rigidity and dynamics of the circle of actuation to a major degree. The favorable features of construction protect the bottom against deformations upon pressurization and bring about a favorable transfer of the tensile stress and bending stress of the bottom into compressive strain into the wall of the piston. The slope has the effect that the mechanical stress of the bottom can be dissipated evenly over a large cross-section into the wall, with stress concentration being avoided thereby.

In a favorable improvement of the invention, a length of the slope projected to the longitudinal axis is smaller than the double wall thickness of the bottom. This geometric limitation achieves a favorable stress routing in the piston, on the one hand, so that an excessive increase in weight of the piston due to an unnecessary material thickening of the wall is prevented.

In order to represent the transition between the slope and the wall in conformity with stress, the slope is inclined relative to the longitudinal axis of the piston at an angle $\alpha$ greater than 1° degree.

A rounded portion is provided between the slope and the bottom in another embodiment of the invention. This measure serves for configuring the piston to comply with stress. It is especially favorable in this respect when the rounded portion is designed at least partly as a recess in the material of the bottom so that a wall thickness of the bottom is reduced at this point.

In particular the reduction of the wall thickness of the bottom in the transition between slope and bottom brings about that tensile stress being close to the surface is distributed over the entire component cross-section of the bottom, whereby the slope is relieved from strain.

This effect is enhanced by the fact that the transition has a radius and that this radius is smaller than the wall thickness of the bottom.

Manufacturing costs are reduced because the wall thickness of the bottom, as a result of the forming processes, increases by more than 1.1 times the thickness of the base material. This allows using a base material with small thickness. Furthermore, the base material can be comparatively soft since the bottom undergoes wear-hardening as a result of the forming processes which now lies more than 1.3 times above the strength of the base material. Both features lead to lower manufacturing costs and tooling costs.

In order to prevent deformations and overloads at the open front side of the piston, the abutment surface of the rim is larger than the cross-sectional surface at the thinnest point of the wall in another embodiment of the invention.

A method for manufacturing a piston comprises the following steps:

forming a disc-shaped round blank into a bowl-type hollow cylinder with a longitudinal axis, with one frontal end of the hollow cylinder being closed by a convexly curved bottom, upsetting the hollow cylinder in its longitudinal axis in one or more forming steps so that the convexly curved bottom is rendered plane and the bottom material is thickened by the upsetting operation, with the result that the wall thickness of the ready bottom increases by more than 1.1 times in relation to the base material.

When this method is employed, it is achieved in an advantageous fashion that the wall thickness of the bottom is increased by upsetting the bottom without the entire hollow cylinder being essentially included. The bottom and the transition area from the bottom into the wall undergo wear-hardening as a result of the forming operation. The thickness of the base material can hereby be reduced, ensuing wherefrom is a reduced waste of raw material and, hence, decrease of the manufacturing costs.

This process is especially favorable when, due to one or more ironing forming steps, a fringe area of the upset bottom passes over into the wall and the wall is thickened in the transition area as a result.

BRIEF DESCRIPTION OF THE DRAWINGS

Further details of the invention can be taken from the drawings by way of the description.

In the accompanying drawings.

DETAILED DESCRIPTION OF THE PREFERRED EMBODIMENTS

Figure 1:
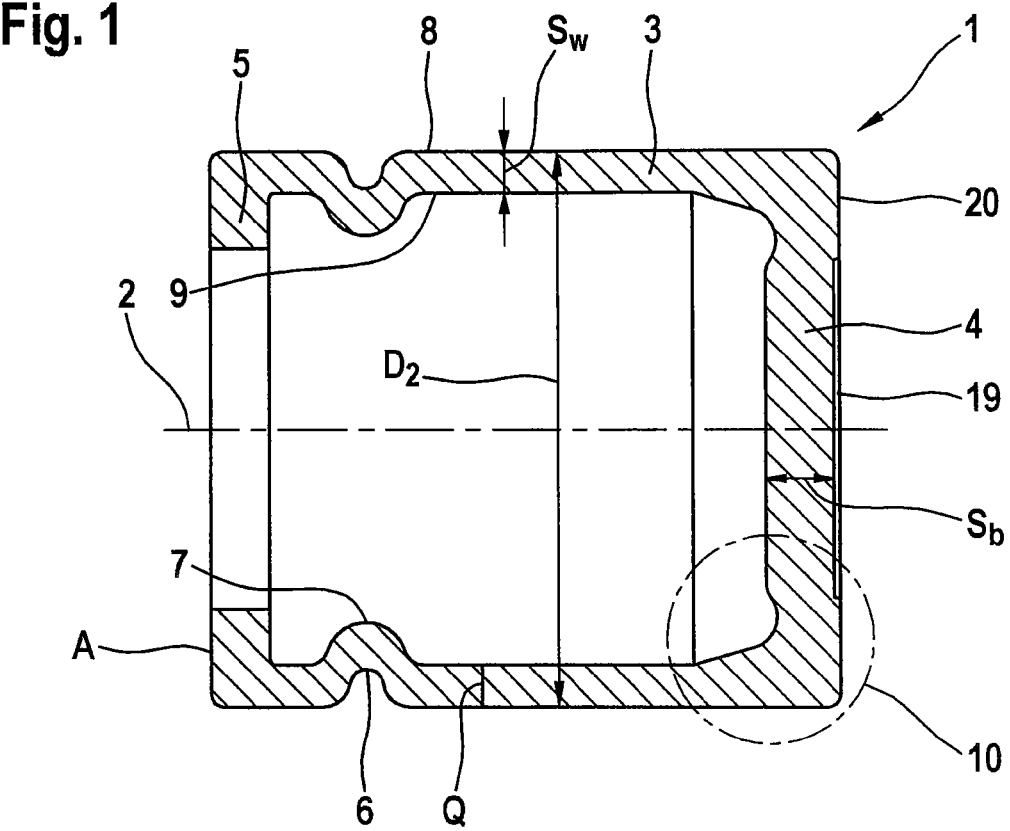
FIG. 1 is a cross-sectional view of a piston of the invention.

FIG. 1 shows a longitudinal cross-sectional view of a piston 1 of the invention. This piston 1 which is designed rotationally symmetrically about a longitudinal axis 2 is configured as a bowl, open on one side, with a wall 3 and a bottom 4, the bowl being delimited at an open frontal end by a rim 5 with an axial abutment surface A which is movable into abutment on a brake pad (not shown). Rim 5 is shaped integrally at wall 3, and the abutment surface A is larger than a cross-sectional surface Q at the weakest point of the wall 3. In addition, a circumferential groove 6 is roller-burnished into an outside surface 8 of the piston 1 close to the rim 5, which groove in its mounted condition is used to accommodate a ring seal (not shown). The contour of the roller-burnished groove continues through the entire cross-section of the wall 3 and, thus, produces a shoulder 7 on an inside surface 9 of the piston 1. At this shoulder 7, pad-holding springs of a back plate of a non-illustrated brake pad are secured in position, whereby the brake pad is fixed at piston 1. A minimum clearance volume 19 is impressed in a plane outside surface 20 of the bottom 4, with the result that venting of the hydraulic system is improved.

Figure 2:
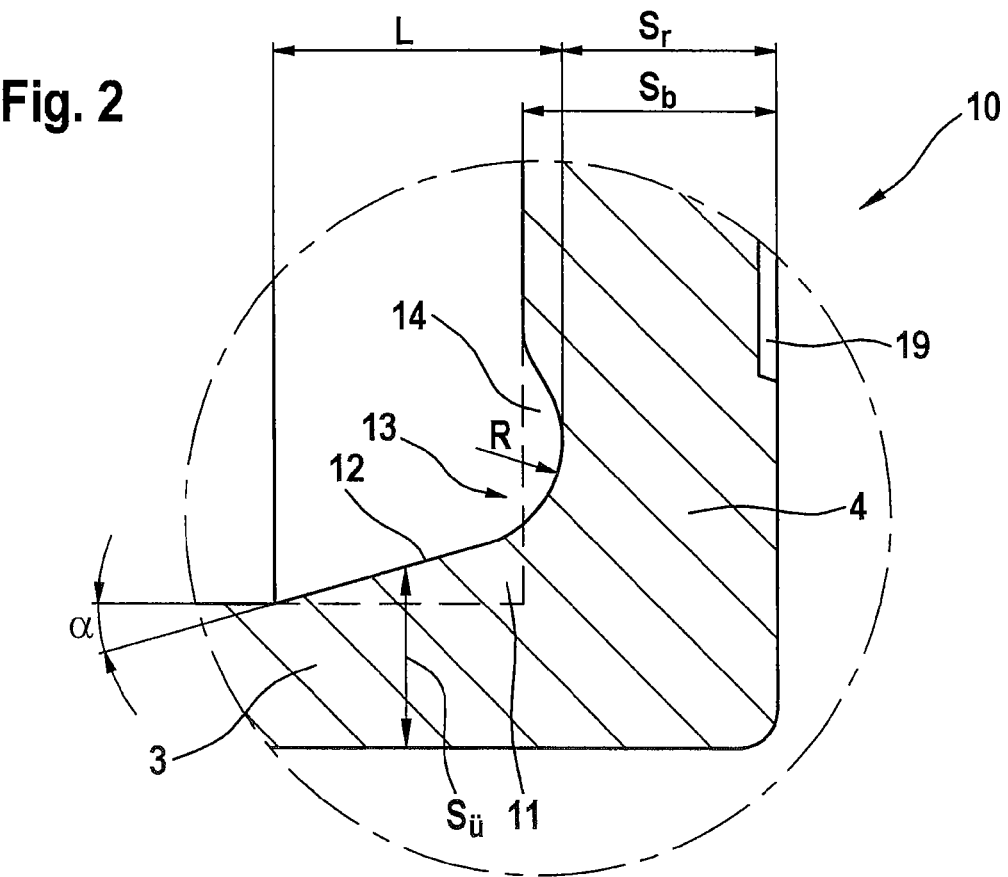
FIG. 2 is an enlarged cross-sectional view of the piston of FIG. 1.

At the point where the wall 3 passes over into the bottom 4, a transition area 10 is provided which is shown in FIG. 2 in an enlarged view. A material thickening 11 of the wall 3 is provided at the inside surface 9 of the piston 1 at the transition area 10. Thickening 11 is designed in such a way that at this point a wall thickness $S\_ü$ of wall 3 increases towards bottom 4 and, hence, wall 3 with a slope 12 passes over into the bottom 4. The slope 12 in relation to the longitudinal axis 2 of piston 1 assumes an angle α of more than 1° degree. Since the material thickening 11 and the slope 12 produced therefrom serve to optimize the stress variation in the transition area 10, it is suitable to limit the size of the slope 2 to the transition area 10 in order to prevent the weight of piston 1 from increasing as a result of unnecessary use of material.

Therefore, the length L of the slope which is projected to the longitudinal axis 2 is smaller than twice the wall thickness $S\_b$ of bottom 4 and is in the dimension of wall thickness $S\_br$ of bottom 4 in an optimal manner. Furthermore, a rounded portion 13 is provided between the slope 12 and the bottom 4, which is partly designed as a recess 14 in the material of bottom 4. This impression into the piston bottom has as a consequence that a wall thickness $S\_r$ prevails at this point of bottom 4 which is reduced in contrast to wall thickness $S\_b$. In detail, this rounded portion 13 has a radius R, with this radius R being smaller than the wall thickness $S\_b$ of bottom 4. It is, however, also feasible to design the transition from the slope into the bottom without a recess and with a variable radius.

As a result of the forming processes, the wall thickness of the bottom increases by preferably in about 1.1 to 1.6 times the thickness $s\_0$ of the base material, and the bottom strengthens roughly by 1.3 times in relation to the base material. Depending on the forming process, the bottom can also exhibit greater strength after the forming process, in particular 1.3 to 2.5 times the base material.

A piston 1 of this type is used in hydraulic brake systems, and it is axially displaceably mounted in a bore of a brake caliper, while hydraulic fluid can be applied to the piston bottom in the bore. When the brake is applied, the piston displaces due to pressurization and shifts a brake pad against a brake disc. This produces a normal force between brake disc and brake pad as well as a friction force.

Figure 3A:
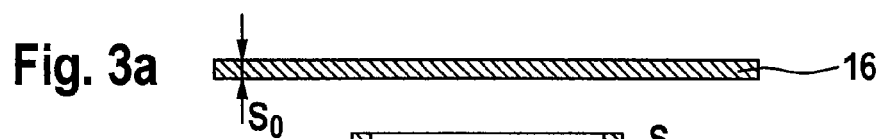
FIG. 3 shows from a) to f) the progressive steps of the forming process.

The manufacture of the piston at topic is executed by means of forming processes, in particular cold forming operations. The most important steps of the entire forming process are shown in FIGS. 3a-f. A disc-shaped blank 16 is punched out of a base material which is preferably sheet metal and mostly rolled strips. The thickness $S\_0$ of the blank 16 is equal to the thickness of the base material. (FIG. 3a)

Figure 3B:
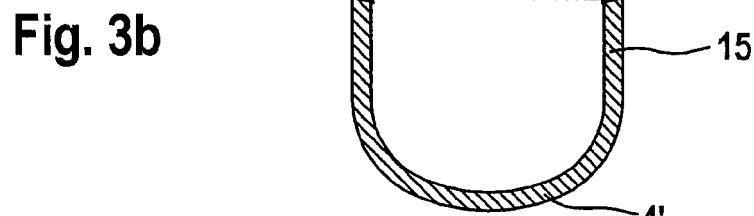

In one or more deep-drawing operations, a bowl-type hollow cylinder 15 with an outside diameter D1 is formed out of the disc-shaped blank 16, the cylinder being closed on a frontal end by a convexly curved hemispherical bottom 4'. In this arrangement, the wall thickness $S\_w$ of the hollow cylinder 15 is essentially equal to the thickness $S\_0$ of the blank 16, and the outside diameter D1 is larger than the outside diameter D2 of the ready-made piston 1. (FIG. 3b)

Figure 3C:
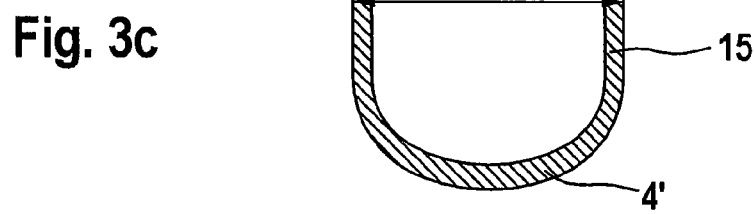
Figure 3D:
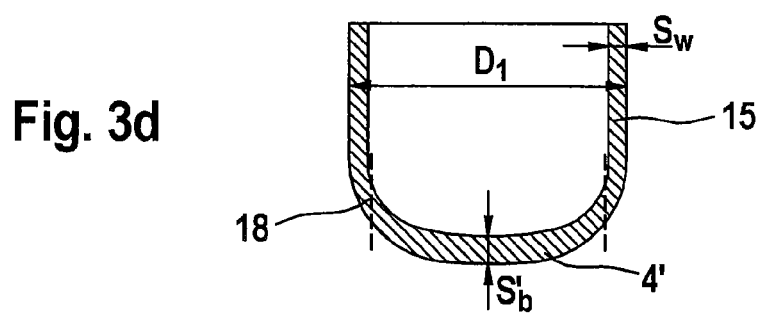
Figure 3E:
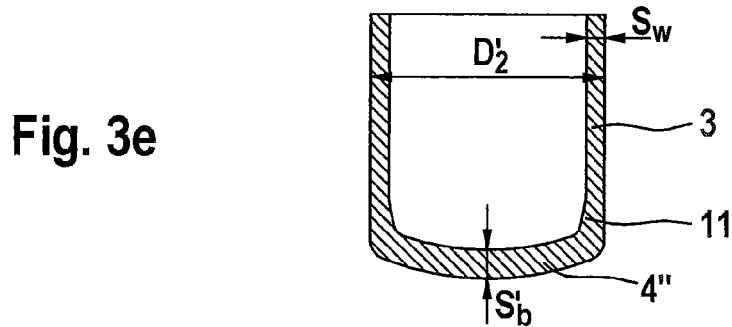
Figure 3F:
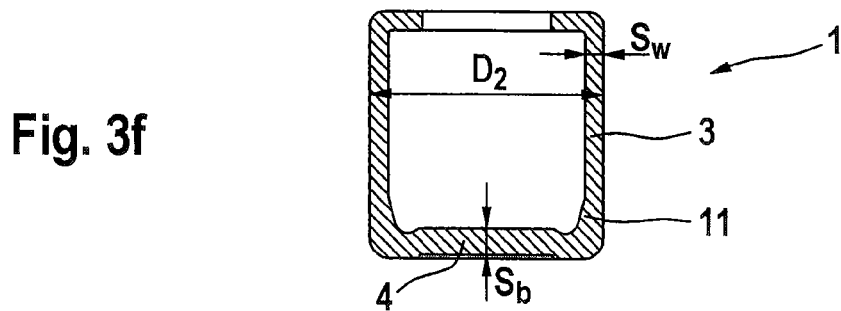

FIGS. 3c, 3d and 3e show schematically how the forming process and thickening operation of the convexly curved hemisphere-type bottom 4' takes place. This is achieved by upsetting the bottom 4' in itself. Material is accumulated this way in the bottom area. The bottom 4' with the wall thickness $S\_b'$ is flattened, yet it is not plane. The outside diameter D1 decreases to D2' as a result of an ironing operation. This makes the radial fringe area 18 of the unfinished bottom 4' pass over into the wall and produces there the material thickening 11. In further calibrating and ironing forming steps, the piston 1 obtains its final plane shape with the outside diameter D2, the wall thickness $S\_w$ of the wall 3 and the wall thickness $S\_b$ of the flattened bottom 4. Appropriate additional forming steps further render it possible to reduce the wall thickness of $S\_w$ and to thereby adapt the wall to the requirements of the piston.

The invention claimed is:

1. Piston for a hydraulic brake, configured as a bowl, open on one side, with a longitudinal axis, a wall with an inner surface parallel to the longitudinal axis and a bottom, wherein
the bottom has an essentially plane outside surface, a wall thickness ($S\_b$) of the bottom is thicker than a minimum wall thickness ($S\_w$) of the wall, and at a transition area between the bottom and wall, a wall thickness ($S\_ü$) of the wall is continuously increasing towards the bottom so that the transition area with a slope passes between the wall into the bottom.

2. Piston for a hydraulic brake as claimed in claim 1, wherein a length (L) of the slope projected to the longitudinal axis is smaller than twice the bottom wall thickness ($S\_b$).

3. Piston for a hydraulic brake as claimed in claim 1, wherein the slope is inclined relative to the longitudinal axis of the piston at an angle ($\alpha$) greater than 1° degree.

4. Piston for a hydraulic brake as claimed in claim 1, wherein a rounded portion is provided between the slope and the bottom.

5. Piston for a hydraulic brake as claimed in claim 4, wherein the rounded portion has a radius (R), and in that this radius (R) is smaller than the wall thickness ($S\_b$) of the bottom.

6. Piston for a hydraulic brake as claimed in claim 1, wherein the wall thickness ($S\_b$) of the bottom increases by more than 1.1 times the thickness ($S\_0$) of a base material during forming of the bowl.

7. Piston for a hydraulic brake as claimed in claim 1, wherein the bottom undergoes wear-hardening during forming processes which amounts to more than 1.3 times the strength of a base material.

8. Piston for a hydraulic brake as claimed in claim 1, wherein the abutment surface is larger than a cross-sectional surface (Q) at the thinnest point of the wall.

9. Piston for a hydraulic brake, configured as a bowl, open on one side, with a longitudinal axis, a wall and a bottom, wherein the bottom has an essentially plane outside surface, a wall thickness ($S\_b$) of the bottom is thicker than a minimum wall thickness ($S\_w$) of the wall, and at a transition area between bottom and wall, a wall thickness ($S\_ü$) of the wall is continuously increasing towards the bottom so that the wall with a slope passes over into the bottom, a rounded portion is provided between the slope and the bottom and the rounded portion is designed partly as a recess in the material of the bottom so that the wall thickness ($S\_b$) of the bottom is reduced at this point.

10. A method for manufacturing a piston for a hydraulic brake, comprising the steps:
  forming a base material into a bowl-type hollow cylinder with a longitudinal axis, with one frontal end of the hollow cylinder being closed by a convexly curved bottom,
  upsetting the hollow cylinder in its longitudinal axis in one or more forming steps so that the convexly curved bottom is rendered plane and the bottom material is thickened by the upsetting operation, with the result that the wall thickness ($S\_b$) of the ready-made bottom increases by more than 1.1 times in relation to the base material.

11. Method as claimed in claim 10, wherein due to one or more forming steps a radial fringe area of the upset bottom passes over into the wall and the wall is thickened in the transition area as a result.

\* \* \* \* \*